(12) United States Patent
Tai

(10) Patent No.: US 10,618,738 B2
(45) Date of Patent: Apr. 14, 2020

(54) MULTICHANNEL FEEDING SYSTEM

(71) Applicant: CHAN LI MACHINERY CO., LTD., Taoyuan (TW)

(72) Inventor: Tu-Chung Tai, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 0 days.

(21) Appl. No.: 16/279,132

(22) Filed: Feb. 19, 2019

(65) Prior Publication Data

US 2019/0263592 A1   Aug. 29, 2019

(30) Foreign Application Priority Data

Feb. 27, 2018   (TW) .............................. 107106579 A (51) Int. Cl.

| | |
|---|---|
| *B65G 15/08* | (2006.01) |
| *B65G 47/52* | (2006.01) |
| *B65G 15/40* | (2006.01) |
| *B65G 47/57* | (2006.01) |
| *B65H 3/04* | (2006.01) |
| *B65H 5/02* | (2006.01) |
| *B65G 47/51* | (2006.01) |
| *B65G 47/61* | (2006.01) |

(Continued)

(52) U.S. Cl.
CPC ............ *B65G 15/08* (2013.01); *B65G 15/40* (2013.01); *B65G 47/5122* (2013.01); *B65G 47/57* (2013.01); *B65G 47/61* (2013.01); *B65H 3/04* (2013.01); *B65H 5/021* (2013.01); *B26D 3/16* (2013.01); *B26D 7/0683* (2013.01); *B65G 2201/0232* (2013.01)

(58) Field of Classification Search
None
See application file for complete search history.

(56) References Cited

U.S. PATENT DOCUMENTS 5,191,963 A * 3/1993 Delsanto .............. B65G 47/082
198/429
5,271,489 A * 12/1993 Helmstetter ....... B65G 47/5122
198/347.1

(Continued)

*Primary Examiner* — Kavel Singh
(74) *Attorney, Agent, or Firm* — Rosenberg, Klein & Lee (57) ABSTRACT

A multichannel paper feeding system in connection to a vertical storage is disclosed. The multichannel paper feeding system includes a main loop transport device, an internal loop transport device, a plurality of take-out devices, and a plurality of take-out conveyor belts, all of which are disposed between the vertical storage and a cutting machine. The main loop transport device transports a paper roll placed on a main loop rack from the vertical storage to the internal loop transport device, where a main push rod then pushes the paper roll onto an internal loop rack, and the internal loop transport device transports the internal loop rack next to a take-out conveyor belt. The take-out device moves the paper roll from the internal loop rack to the corresponding take-out conveyor belt so that the paper roll can be transported further downstream to a post-processing station for cutting or packaging. Through the internal loop transport device, not only can more take-out conveyor belts be added and may the post-processing production be increased, the transport quality of the paper rolls is also enhanced.

10 Claims, 10 Drawing Sheets

(51) Int. Cl.
*B26D 3/16* (2006.01)
*B26D 7/06* (2006.01)

(56) References Cited

U.S. PATENT DOCUMENTS

| | | | | |
|---|---|---|---|---|
| 6,640,960 B1* | 11/2003 | Spettl | ............... | B65G 47/5122 |
| | | | | 198/347.1 |
| 8,162,127 B2* | 4/2012 | Humele | ............... | B65G 17/18 |
| | | | | 198/347.1 |
| 2012/0061204 A1* | 3/2012 | Philipp | ............... | B65G 45/22 |
| | | | | 198/339.1 |

* cited by examiner

MULTICHANNEL FEEDING SYSTEM

REFERENCE TO RELATED APPLICATIONS

This non-provisional application claims priority claim under 35 U.S.C. § 119(a) on Taiwan Patent Application No. 107106579 filed Feb. 27, 2018, the entire contents of which are incorporated herein by reference.

FIELD OF THE INVENTION

The invention relates to a paper feeding system, more particularly, to a multichannel feeding system in connection to a vertical storage and capable of transporting paper rolls to post-processing stations via a plurality of take-out conveyor belts.

BACKGROUND

During paper-making process, long paper rolls are produced as semi-finished products and are generally stored in a vertical storage unit for reducing space occupied by manufacturing equipment in the facility. When the paper rolls are needed for further processing, they are moved by transport or take-out equipment from the vertical storage to a conveyor, and then sent to a post-processing station via the conveyor. For example, when paper cutting or packaging is needed, the paper rolls are transported from the vertical storage at a high position to the conveyor at a lower position and then sent to a cutting machine or a packaging machine to finish the cutting or packaging of paper in rolls.

In order to increase the post-processing production, the industry wants to add more conveyors at the transportation or distribution stage and accompany each conveyor with a corresponding cutting or packaging machine. However, in implementing the design having more than two conveyors as distribution channels, many technical issues arise due to factors like the complicated structural design of transverse-movement device, the overtake of facility space by the equipment, and the differences in the distance needed for each channel to take out the paper rolls.

Moreover, the quality of paper processing is affected since the paper rolls are easily bumped, squeezed, banged, or damaged when being transported from the vertical storage to the post-processing station as a transport system is required to move the paper rolls from an elevated position to the ground level.

Therefore, the invention discloses a multichannel feeding system that solves the abovementioned deficiencies.

SUMMARY

The main objective of the present invention is to provide a multichannel feeding system that can safely transport a plurality of paper rolls to corresponding take-out conveyor belts by using an internal loop transport device. The multichannel system is applicable with a plurality of paper take-out conveyor belts and also can increase the post-processing production.

It is another objective of the present invention to provide a multichannel feeding system that can continuously operate the transportation of multiple paper rolls by using an internal loop transport device and a take-out device. The transport quality of the paper rolls is therefore ensured and the number of take-out conveyor belts can be easily expanded.

It is another objective of the present invention to provide a multichannel feeding system that can reduce the work space occupied for paper roll transportation by using an internal loop transport device, a take-out device, and a main loop transport device.

For achieving above objects, the present invention provides a multichannel feeding system, which includes a main loop transport device, an internal loop transport device, a push device, and a take-out device. The main loop device includes a main loop conveyor belt that extends downward through a first main loop section and a second main loop section, wherein the first main loop section is located between a vertical storage and the second main loop section. The main loop conveyor belt has a plurality of main loop racks disposed thereon, and each of the main loop racks can carry a paper roll and move from the vertical storage, through the first main loop section, and toward the second main loop section. The internal loop transport device includes an internal loop conveyor belt that passes a first internal loop section and a second internal loop section, wherein the first internal loop section is adjacent to the second main loop section of the main loop transport device. The internal loop conveyor belt has a plurality of internal loop racks disposed thereon and the internal loop racks move along with the conveyor belt from the first internal loop section to the second internal loop section. The push device includes a movable main push unit and a main push rod mounted on the movable main push unit. The movable main push unit is disposed beside the main loop conveyor belt at the second main loop section and is capable of vertical movement. The main push rod can push the paper roll on the main loop rack onto the internal loop rack at the first internal loop section. The take-out device is disposed below the second internal loop section of the internal loop transport device and includes a plurality of movable take-out units and a take-out rack mounted on each of the movable take-out units. The take-out rack can transport the paper roll on the internal loop rack to a corresponding take-out conveyor belt with the movement of the movable take-out unit.

In one embodiment of the invention, the internal loop rack includes a plurality of internal loop rack arms and an internal loop gap formed between each two of the internal loop rack arms. The take-out rack includes a plurality of take-out rack arms and a take-out rack gap formed between each two adjacent take-out rack arms, wherein the take-out rack arms can pass through the internal loop rack gaps, raise the paper roll on the internal loop rack up, and remove it from the internal loop rack.

In one embodiment of the invention, the take-out device includes a take-out rod disposed beside the take-out conveyor belt, wherein when the take-out rack transports the paper roll next to the take-out conveyor belt, and the take-out rod pushes the paper roll onto the take-out conveyor belt.

In one embodiment of the invention, the internal loop conveyor belt of the internal loop transport device can pass through a third internal loop section, wherein the internal loop conveyer belt forms a closed-loop conveyor belt by passing through the first internal loop section, the second internal loop section, and the third internal loop section.

In one embodiment of the invention, when the main push rod of the push device pushes the paper roll, the moving speed of the movable main push unit is the same as the moving speed of the main loop conveyor belt in the second main loop section and the moving speed of the internal loop conveyor belt in the first internal loop section.

In one embodiment of the invention, the main loop rack includes a plurality of main loop rack arms and a main loop rack gap formed between each two of the main loop rack arms. The main push rod includes a plurality of push rod arms and a push rod gap is formed between every two of the push rod arms, wherein the push rod arms can pass through the main loop rack gaps and push the paper roll from the main loop rack onto the internal loop rack.

In one embodiment of the invention, the internal loop transport device is disposed between the vertical storage and the main loop transport device.

In one embodiment of the invention, the push device is disposed between the vertical storage and the main loop transport device, and the internal loop transport device is disposed on one side of the main loop transport device.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
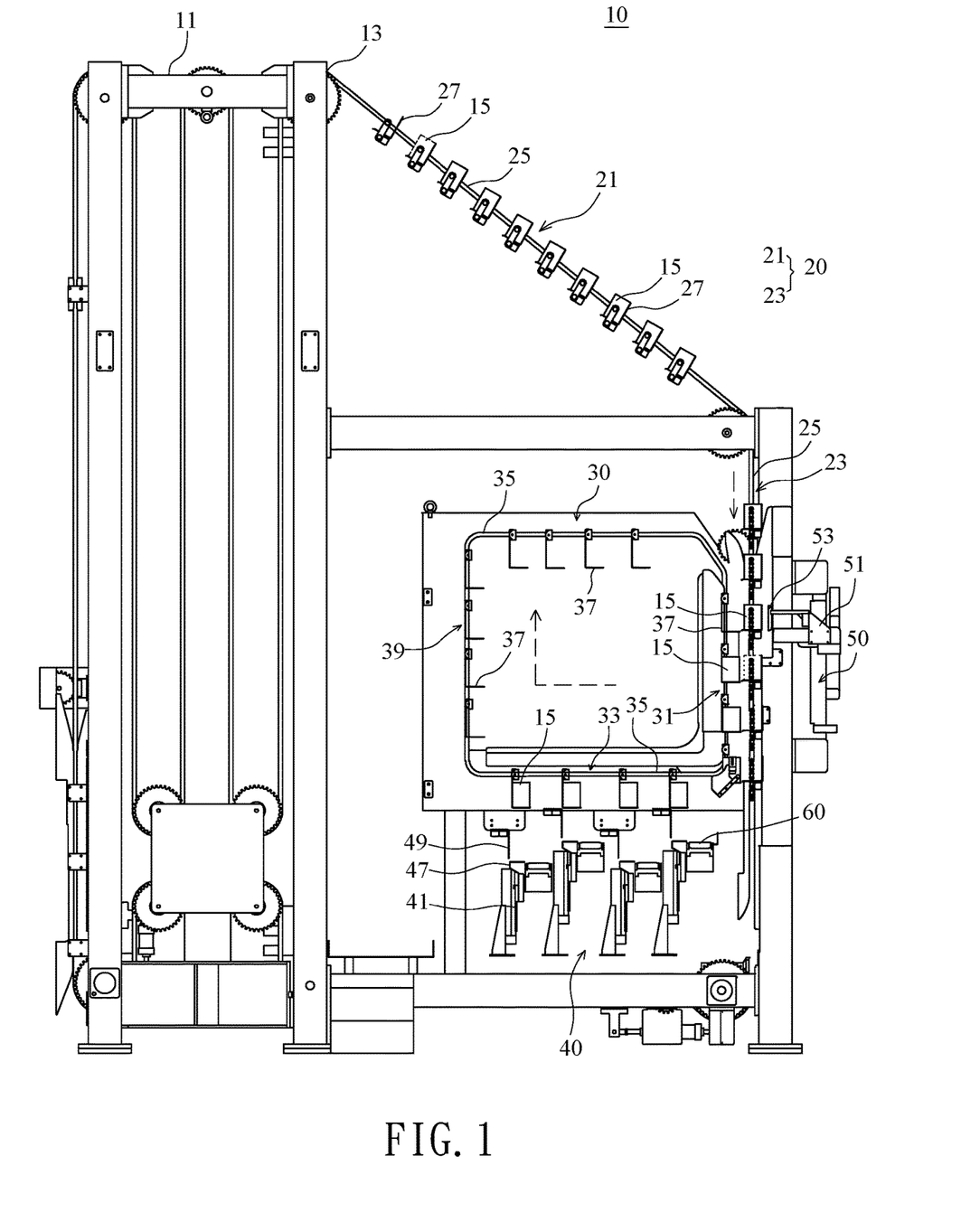
FIG. 1 is a schematic diagram of a multichannel feeding system according to an embodiment of the invention.

FIG. 1 is a schematic diagram of a multichannel feeding system according to a preferred embodiment of the invention. The multichannel feeding system 10 includes a main loop transport device 20, an internal loop transport device 30, a push device 50, and a take-out device 40. The main loop transport device 20 includes a main loop conveyer belt 25 that extends downward and passes through a first main loop section 21 and a second main loop section 23. The first main loop section 21 is located between the second main loop section 23 and an exit end 13 of a vertical storage 11. The internal loop transport device 30 and the push device 50 are located at two sides of the second main loop section 23, respectively, while the take-out device 40 is disposed below the internal loop transport device 30. The vertical storage 11 is used to store and place a plurality of paper rolls 15.

The main loop conveyor belt 25 of the main loop transport device 20 includes a plurality of main loop racks 27 disposed thereon. When each of the main loop racks 27 moves out of the exit end 13 of the vertical storage 11 and enters the first main loop section 21, a paper roll 15 is placed on the main loop rack 27. The first main loop section 21 extends downward at an oblique angle from the exit end 13 at a higher position to the meeting point of the two main loop sections at a relative lower position, and thus the main loop rack 27 moves with the main loop conveyor belt 25 through the first main loop section 21 to the second main loop section 23, and further to an even lower position in the second main loop section 23.

The internal loop transport device 30 is disposed beside the second main loop section 23 of the main loop transport device 20. The internal loop transport device 30 includes an internal loop conveyor belt 35 with a plurality of internal loop racks 37 disposed thereon, and the plurality of internal loop racks 37 are used for carrying the paper rolls 15. The internal loop conveyer belt 35 passes through a first internal loop section 31 and a second internal loop section 33, wherein the first internal loop section 31 is adjacent to the second main loop section 23. In one embodiment, a moving speed of the internal loop racks 37 in the first internal section 31 is the same as a moving speed of the main loop racks 27 in the second main loop section 23.

The push device 50 is disposed on the other side of the second main loop section 23, opposing to the first internal loop section 31. The push device 50 includes a movable main push unit 51 that is movable vertically in an up-and-down direction, and a main push rod 53 is mounted on the movable main push unit 51 and is capable of moving or retracting transversely. The main push rod 53 pushes the paper roll 15 on the main loop rack 27 onto the internal loop rack 37, and the paper roll 15 moves with the internal loop rack 37 from the first internal loop section 31 to the second internal loop section 33.

The take-out device 40 is disposed below the internal loop transport device 30 and under the second internal loop section 33, in other words, at a lower-edge position of the second internal loop section 33 of the internal loop transport device 30. The take-out device 40 includes a plurality of movable take-out units 41 that can move in a vertical direction and each of the movable take-out units 41 includes a take-out rack 47 mounted thereon, such that the take-out rack 47 moves up and down with the movement of the movable take-out unit 41. When the take-out rack 47 moves upward, the paper roll 15 on the internal loop rack 37 is removed therefrom, and when the pick-up rack 47 moves downward, the paper roll 15 is taken next to a corresponding take-out conveyor belt 60 and leaves the internal loop transport device 30. The take-out device 40 further includes a take-out rod 49 for pushing the paper roll 15 on the take-out rack 47 onto the corresponding take-out conveyor belt 60. The paper roll 15 is then transported by the take-out conveyor belt 60 to the post-processing equipment/station, like a cutting machine or a packaging machine, for subsequent processing, like the cutting or packaging of paper rolls.

According to one embodiment of the invention, the internal loop transport device 30 is disposed between the vertical storage 11 and the main loop transport device 20, thereby saving space in the production facility as shown in FIG. 1. In another embodiment of the invention, the push device 50 is disposed between the vertical storage 11 and the main loop transport device 20 and the internal loop transport device 30 is disposed on another side of the second main loop section 23, thereby increasing the quantity/number of take-out racks 47 and the quantity/number of take-out conveyor belts 60.

Figure 2A:
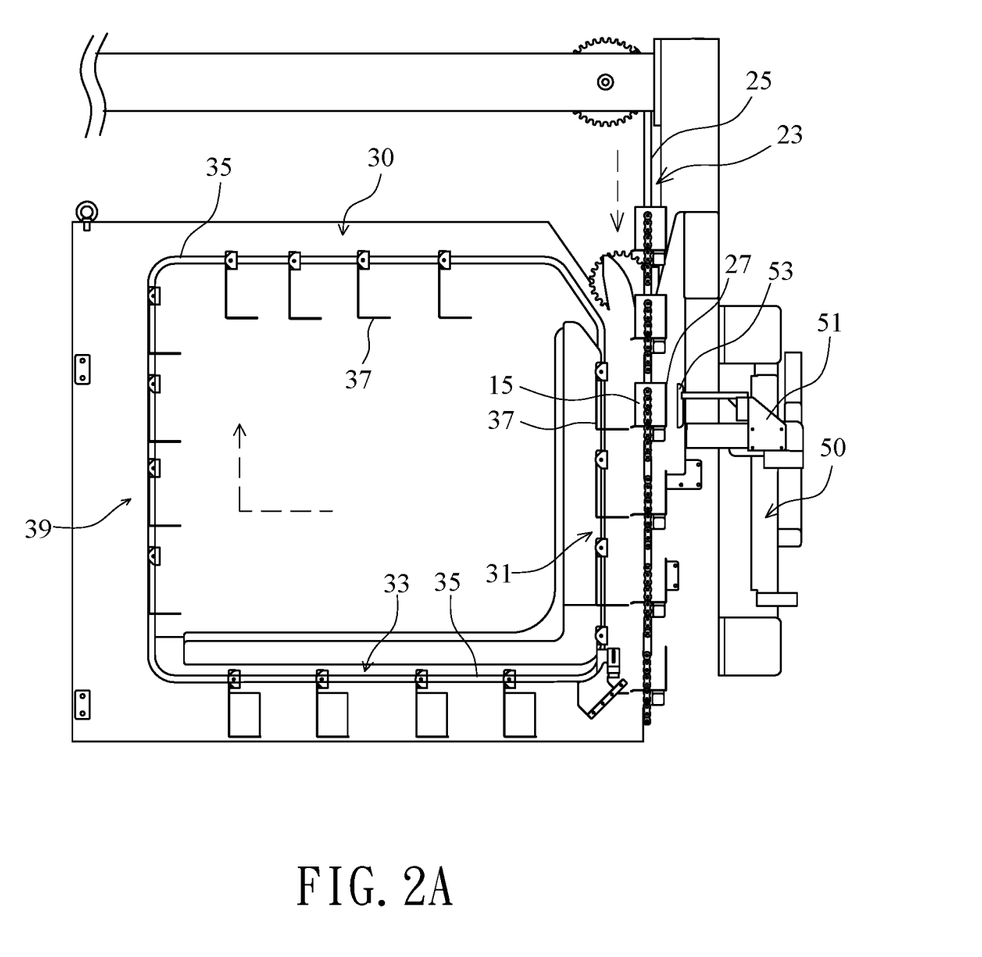
FIGS. 2A-2C are partial schematic diagrams illustrating a main loop transport device, an internal loop transport device, and a push device of a multichannel feeding system in operation according to an embodiment of the invention.

FIG. 2A, FIG. 2B, FIG. 2C, and FIG. 3 are step-by-step partial schematic diagrams illustrating the main loop transport device, the internal loop transport device and the push device in operation and a partial schematic diagram thereof, respectively. As shown in FIG. 2A, after the main loop rack 27 having the paper roll 15 placed thereon enters the second main loop section 23, the internal loop rack 37 of the internal loop transport device 30 moves at the same speed as the main loop rack 27, and the movable main push unit 51 of the push device 50 drives the main push rod 53 next to the main loop rack 27 and also moves downward at the same speed as the main loop rack 27.

Figure 2B:
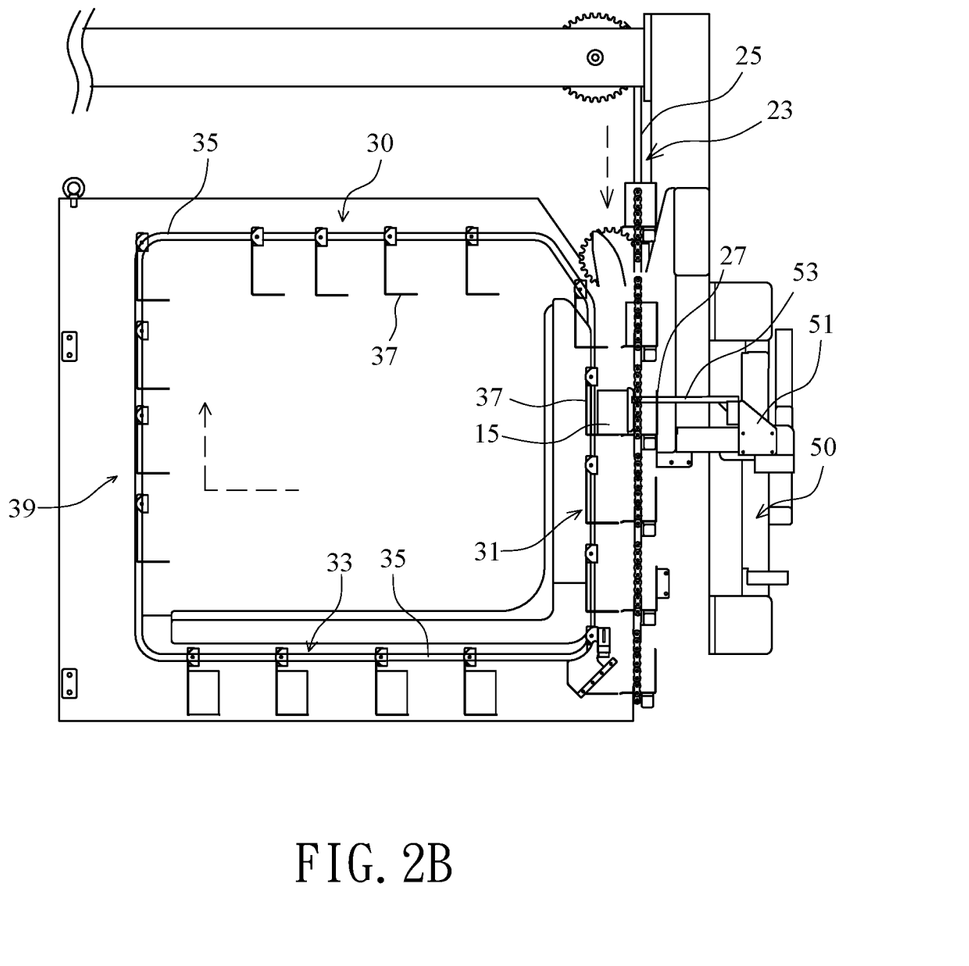
Figure 3:
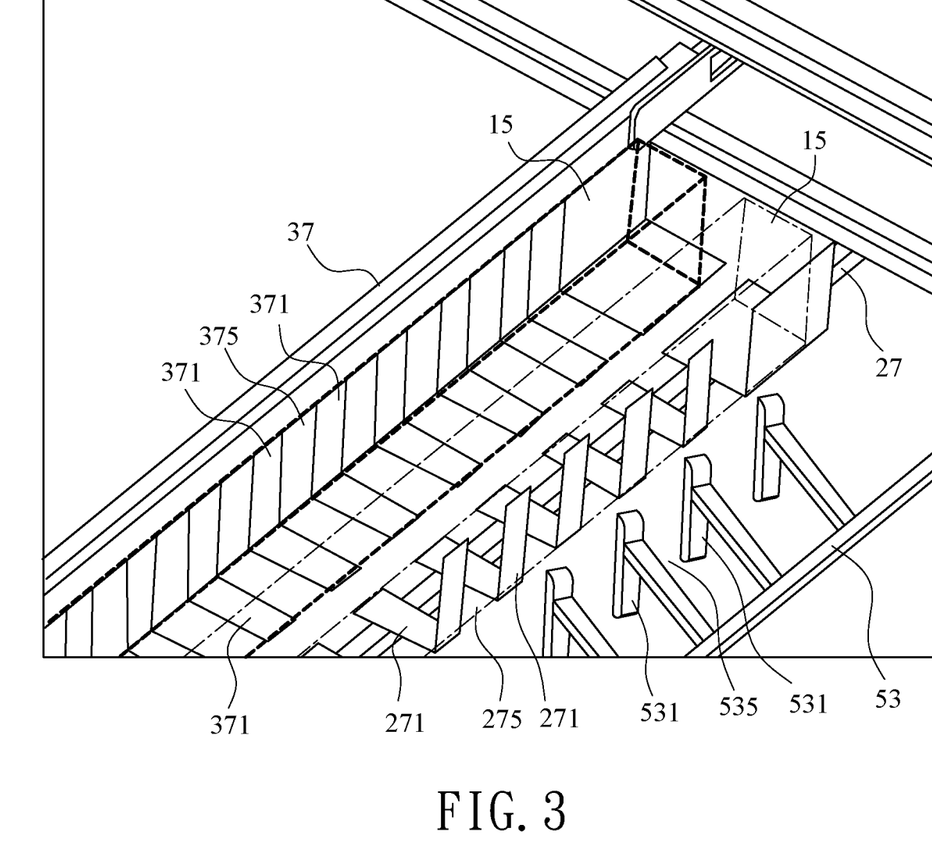
FIG. 3 is a partial schematic diagram of a push device, a main loop rack, and an internal loop rack according to an embodiment of the invention.

In other words, the corresponding internal loop rack 37, the corresponding main loop rack 27, and the main push rod 53 align and move downward at one speed. The main loop rack 27 includes a plurality of main loop rack arms 271 and a plurality of main loop rack gaps 275 formed between the main loop rack arms 271; each of the main loop rack gaps 275 is formed between each two of the main loop rack arms 271. The main loop rack arms 271 are used for placing the paper roll 15 thereon. The main push rod 53 includes a plurality of push rod arms 531, wherein a push rod gap 535 is formed between each two of the push rod arms 531. Hence, by having the push rod arms 531 pass through corresponding main loop rack gaps 271, the retractable main push rod 53 is able to push the paper roll 15 on the main loop rack arms 271 onto the internal loop rack 37 while moving in sync with the main loop rack 27, as shown in FIG. 2B and FIG. 3. The internal loop rack 37 includes a plurality of internal loop rack arms 371, wherein an internal loop rack gap 375 is formed between each two of the internal loop rack arms 371, and the internal loop rack arms 371 are used to carry the paper roll 15.

Figure 2C:
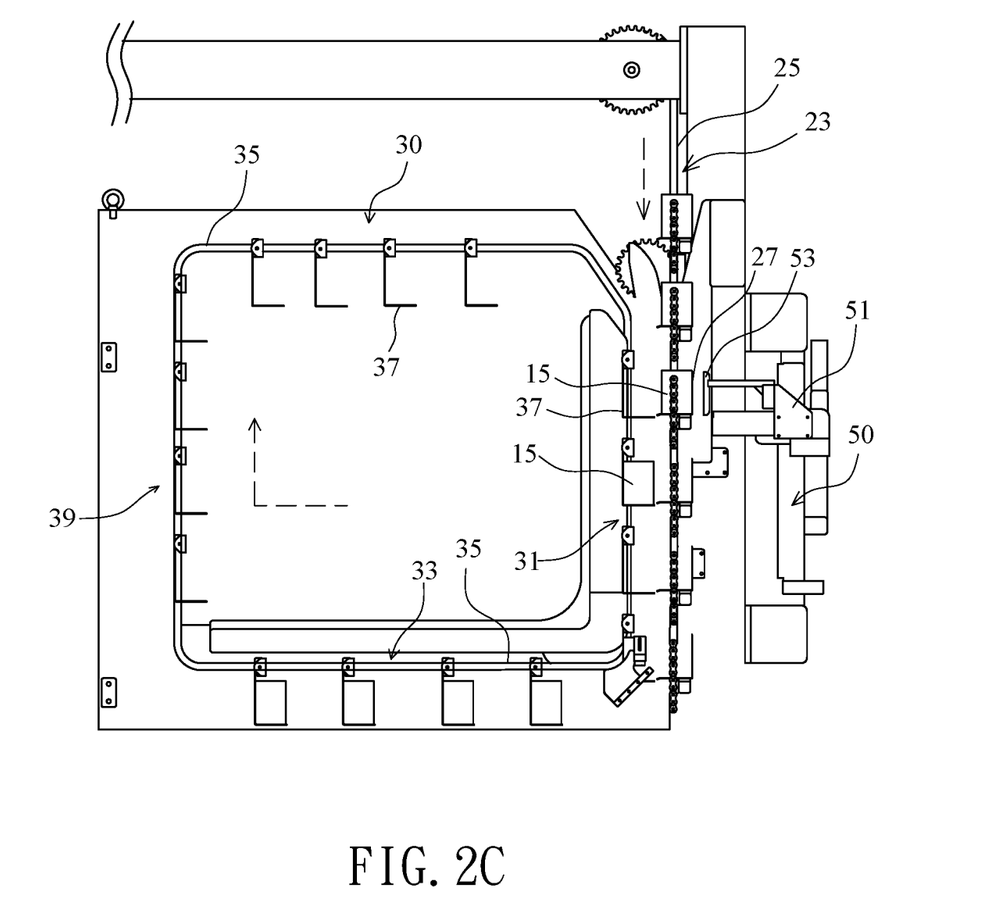

Referring to FIG. 2C, once the push rod arms 531 of the main push rod 53 pushes the paper roll 15 from the main loop rack 27 onto the internal loop rack 37, the main push rod 53 and the push rod arms 531 move backward toward the push device, depart from the main loop rack 27, and then move upward next to the subsequent main loop rack 27 carrying a paper roll 15, thereby returning to the initial preparation state for pushing the paper roll 15.

The push device 50 of the invention repeats the routine shown in FIG. 2A, FIG. 2B, and FIG. 2C and therefore continuously pushes the paper roll 15 on the main loop rack 27 to the corresponding internal loop rack 37.

Figure 4A:
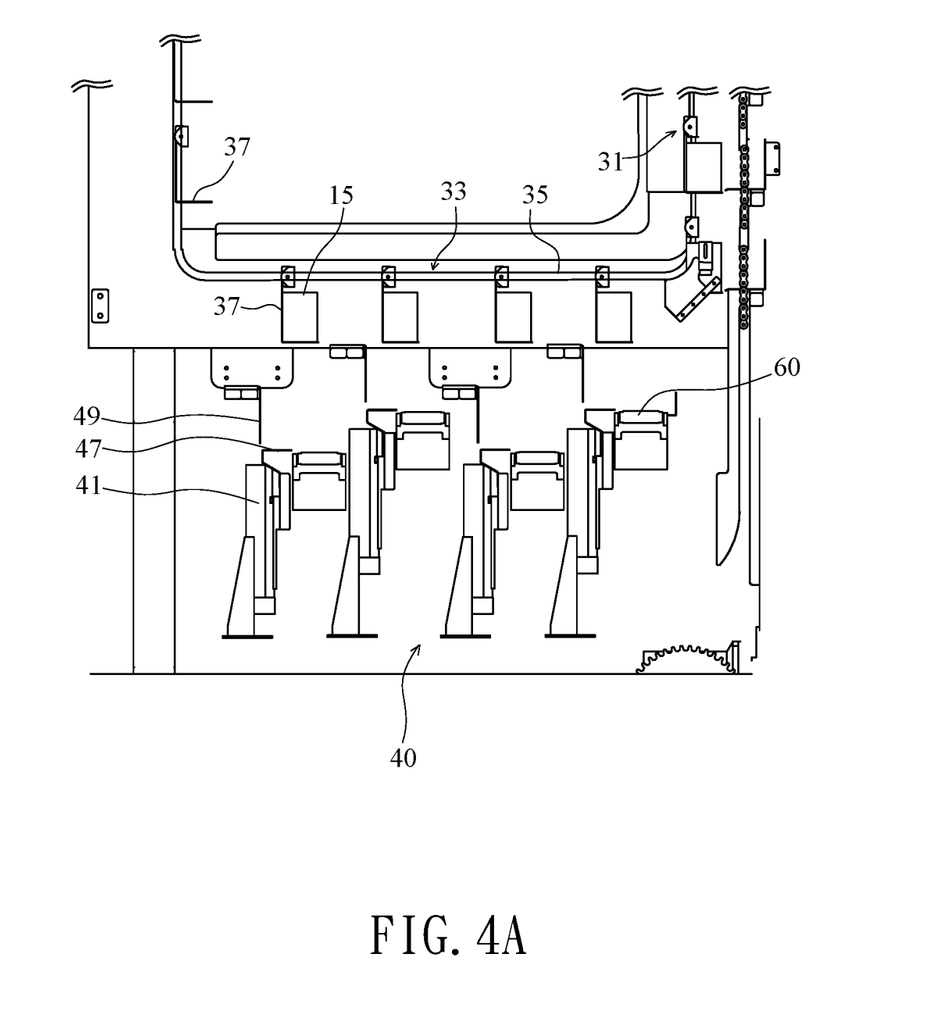
FIGS. 4A-4D are partial schematic diagrams illustrating an internal loop transport device and a take-out device of a multichannel feeding system in operation according to an embodiment of the invention.

Next, FIGS. 4A-D and FIG. 5 are step-by-step partial schematic diagrams of the internal loop transport device 30 and the take-out device 40 during operation and a partial schematic diagram thereof, respectively. When the internal loop rack 37 carrying the paper roll 15 enters the second internal loop section 33, the take-out device 40 disposed under the internal loop transport device 30 also starts to actuate. The take-out device 40 includes a movable take-out unit 41, a take-out rack 47, and a take-out rod 49, wherein the take-out rack 47 moves vertically up and down with the movable take-out unit 41, and a corresponding take-out conveyor belt 60 is disposed beside the take-out rack 47, as shown in FIG. 4A.

Figure 4B:
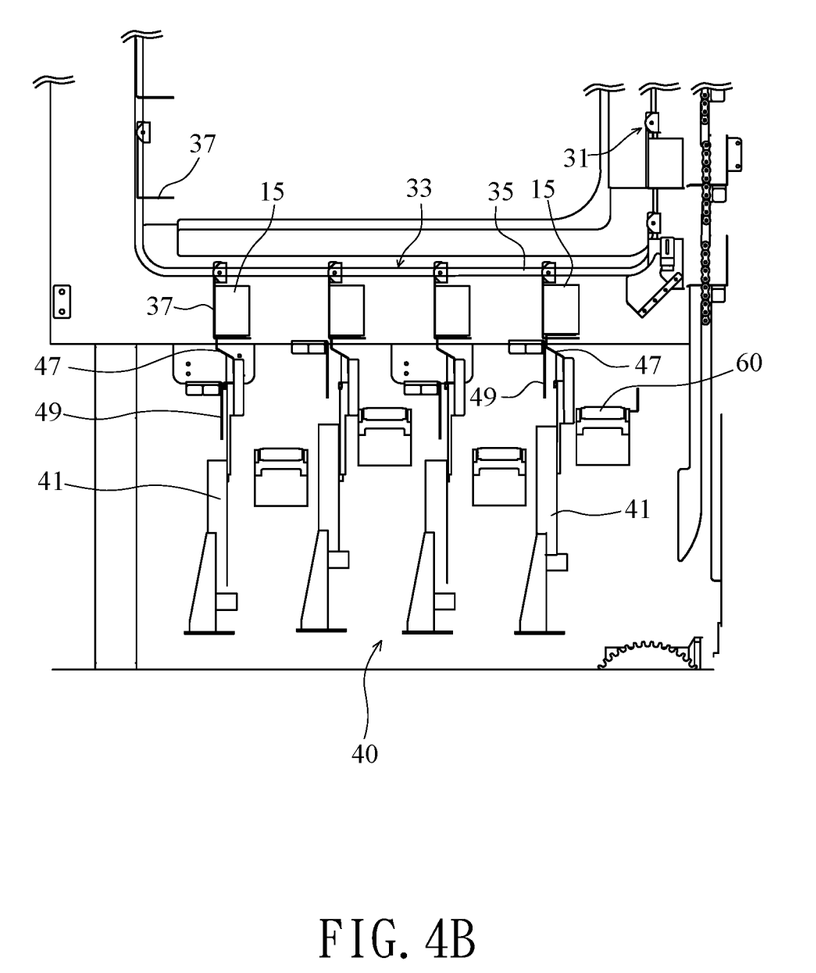
Figure 5:
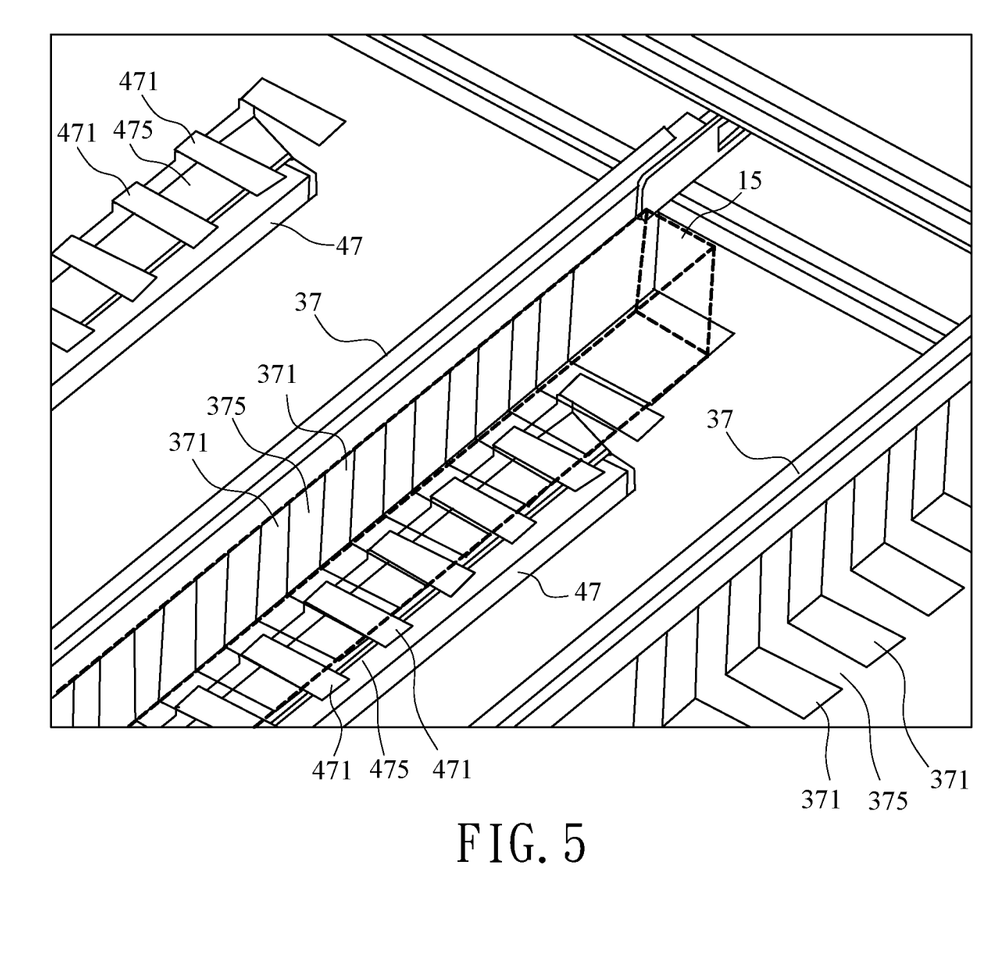
FIG. 5 is a partial schematic diagram of a pick-up device and an internal loop rack according to an embodiment of the invention.

Referring to FIG. 4B and FIG. 5, the take-out rack 47 includes a plurality of take-out rack arms 471 and a take-out rack gap 475 is formed between each two of the take-out rack arms 471. When the internal loop rack 37 arrives at a predetermined position in the second internal loop section 33, the take-out rack 47 moves upward with the movable take-out unit 41 and the take-out rack arms 471 pass through the internal loop rack gaps 375 of the internal loop rack 37 to raise up the paper roll 15 that was placed on the internal loop rack arms 371 and remove it from the internal loop rack 37. The internal loop rack arms 371 of the internal loop rack 37 then pass through the take-out rack gaps 475, thereby achieving the goal of separating the internal loop rack 37 and the take-out rack 47.

Figure 4C:
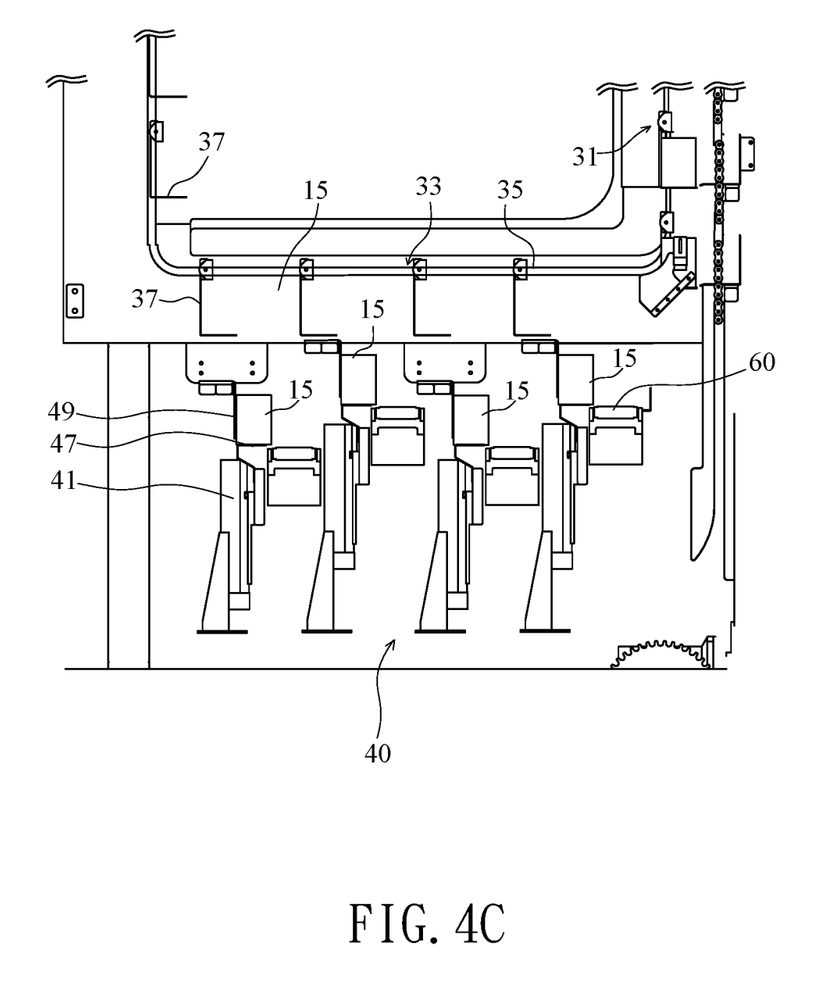

Subsequently, the internal loop rack 37 continues to move towards the third internal loop section 39, and the take-out rack 47 carrying the paper roll 15 moves downward along with the movable take-out unit 41 next to the corresponding take-out conveyor belt 60, as shown in FIG. 4C.

Figure 4D:
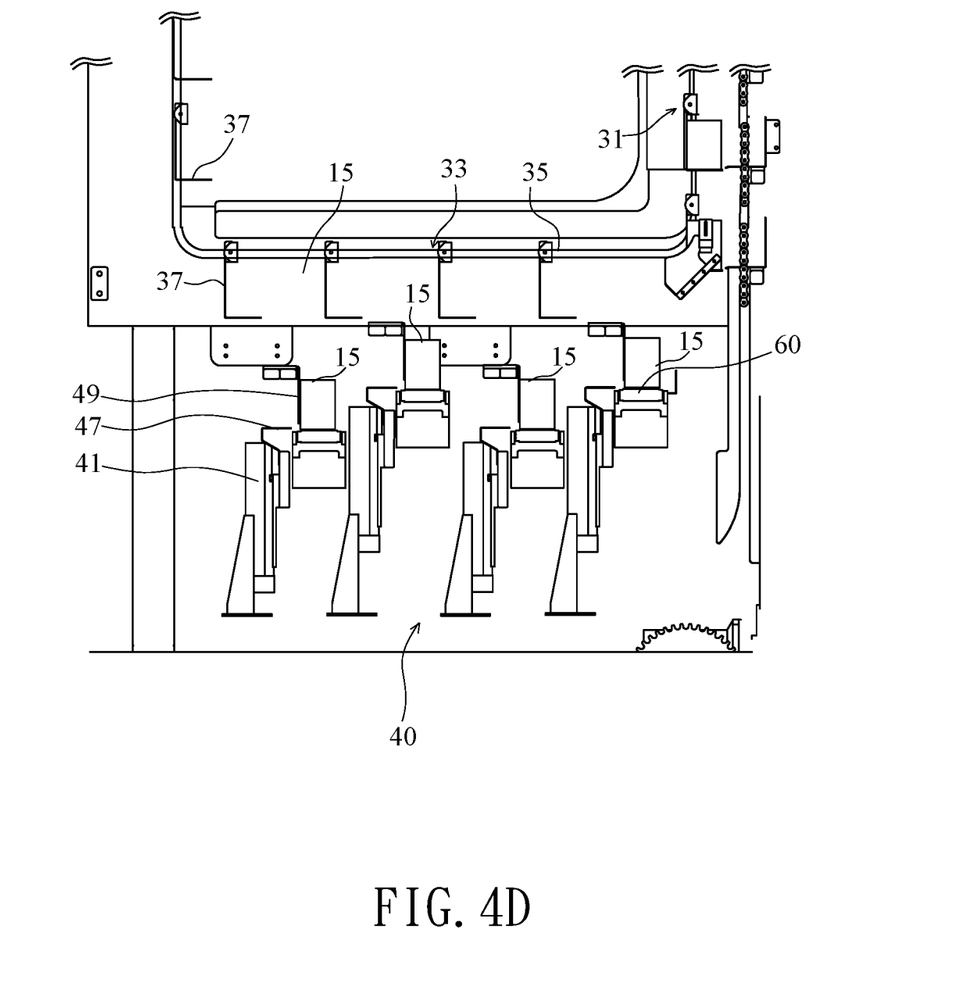

Referring to FIG. 4D, the take-out rod 49 moves and pushes the paper roll 15 on the take-out rack 47 onto the corresponding take-out conveyor belt 60, and via the take-out conveyor belt 60, the paper roll 15 is transported to the post-processing equipment/station (not illustrated) at the end of the take-out conveyor belt, like a cutting machine or a packaging machine, for the cutting or packaging of the paper roll. The take-out device 40 of the invention continuously repeats the operation shown in FIGS. 4A-4D, and hence pushes the paper roll 15 on the internal loop rack 37 onto the corresponding take-out conveyor belt 60 non-stop.

The invention increases the post-processing paper production and product yields in limited production facility space by placing a plurality of take-out devices 40 and a plurality of take-out conveyor belts 60 at the second internal loop section 33 of the internal loop transport device 30. Moreover, the production lines increased by the take-out conveyor belts 60 can be more than two sets, for instance, three sets.

In another embodiment of the invention, the internal loop transport device 30 includes a first internal loop section 31, a second internal loop section 33, and a third internal loop section 39, wherein the internal loop conveyor belt 35 passes through the first internal loop section 31, the second internal loop section 33, and the third internal loop section 39 to form a closed-loop conveyor belt.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A multichannel feeding system, comprising:
    a main loop transport device comprising:
        a main loop conveyor belt;
        a first main loop section;
        a second main loop section; and
        a plurality of main loop racks, each disposed on the main loop conveyor belt and capable of carrying a paper roll,
        wherein the main loop conveyor belt extends downward and passes through the first main loop section and the second main loop section, the first main loop section is located between a vertical storage and the second main loop section, and the paper roll moves from the vertical storage, through the first main loop section, toward the second main loop section;
    an internal loop transport device comprising:
        an internal loop conveyor belt;
        a first internal loop section adjacent to the second main loop section of the main loop transport device;
        a second internal loop section; and
            a plurality of internal loop racks, each disposed on the internal loop conveyor belt;
        wherein the internal loop conveyor belt passes through the first internal loop section and the second internal loop section, and the internal loop rack moves with the internal loop conveyor belt from the first internal loop section to the second internal loop section;
    a push device comprising:
        a movable main push unit disposed beside the main loop conveyor belt at the second main loop section and capable of vertical movement; and a main push rod mounted on the movable main push unit for pushing the paper roll on the main loop rack onto the internal loop rack at the first internal loop section; and a take-out device disposed below the second internal loop section of the internal loop transport device, the take-out device comprising a plurality of movable take-out units and a take-out rack mounted on each of the movable take-out units, wherein the take-out rack transports the paper roll on the internal loop rack to a corresponding take-out conveyor belt.

2. The multichannel feeding system of claim 1, wherein the number of movable take-out units of the take-out device is the same as the number of take-out conveyor belts.

3. The multichannel feeding system of claim 1, wherein the internal loop rack comprises a plurality of internal loop rack arms and an internal loop rack gap is formed between each two of the internal loop rack arms, and the take-out rack comprises a plurality of take-out rack arms and a take-out rack gap is formed between each two of the take-out rack arms, wherein the take-out rack arm passes through the internal loop rack gap, raises the paper roll on the internal loop rack up, and removes the paper roll from the internal loop rack.

4. The multichannel feeding system of claim 1, wherein the take-out device comprises a take-out rod disposed beside the take-out conveyor belt, and when the take-out rack transports the paper roll next to the take-out conveyor belt, the take-out rod pushes the paper roll onto the take-out conveyor belt.

5. The multichannel feeding system of claim 1, wherein the internal loop transport device further comprises a third internal loop section, and the internal loop conveyor belt passes through the first internal loop section, the second internal loop section, and the third internal loop section to form a closed-loop conveyor belt.

6. The multichannel feeding system of claim 1, wherein when the main push rod of the push device pushes the paper roll, a speed of the movable main push unit is the same as a speed of the main loop conveyor belt moving in the second main loop section and a speed of the internal loop conveyor belt moving in the first internal loop section.

7. The multichannel feeding system of claim 2, wherein the number of take-out conveyor belts is at least three.

8. The multichannel feeding system of claim 1, wherein the main loop rack comprises a plurality of main loop rack arms and a main loop rack gap is formed between each two of the main loop rack arms, and the main push rod comprises a plurality of push rod arms and a push rod gap is formed between each two of the push rod arms, wherein the push rod arm passes through the main loop rack gap and pushes the paper roll on the main loop rack onto the internal loop rack.

9. The multichannel feeding system of claim 1, wherein the internal loop transport device is disposed between the vertical storage and the main loop transport device.

10. The multichannel feeding system of claim 1, wherein the push device is disposed between the vertical storage and the main loop transport device and the internal loop transport device is disposed on one side of the main loop transport device.

* * * * *